United States Patent
Fuchs et al.

(10) Patent No.: US 10,199,821 B2
(45) Date of Patent: Feb. 5, 2019

(54) SYSTEMS AND METHODS FOR ACTUATING A TRANSFORMER NEUTRAL BLOCKING SYSTEM

(71) Applicant: Emprimus, LLC, St. Louis Park, MN (US)

(72) Inventors: Greg Fuchs, River Falls, WI (US); Wallace Jensen, Centerville, MN (US); Frederick R. Faxvog, Long Lake, MN (US); David Blake Jackson, Excelsior, MN (US); Gale K. Nordling, Excelsior, MN (US)

(73) Assignee: Emprimus, LLC, Minneapolis, MN (US)

( * ) Notice: Subject to any disclaimer, the term of this patent is extended or adjusted under 35 U.S.C. 154(b) by 108 days.

(21) Appl. No.: 14/989,631

(22) Filed: Jan. 6, 2016

(65) Prior Publication Data
US 2016/0197469 A1    Jul. 7, 2016

Related U.S. Application Data

(60) Provisional application No. 62/100,395, filed on Jan. 6, 2015.

(51) Int. Cl.
*H02H 7/04* (2006.01)
*H02H 3/08* (2006.01)
(Continued)

(52) U.S. Cl.
CPC ............... *H02H 7/04* (2013.01); *H02H 3/08* (2013.01); *H02H 3/20* (2013.01); *H02H 3/50* (2013.01); *H02H 5/005* (2013.01)

(58) Field of Classification Search
CPC .... H01T 2/02; H01T 4/06; H01T 4/10; H01T 4/14; H02H 9/06; H02H 1/0007;
(Continued)

(56) References Cited

U.S. PATENT DOCUMENTS 8,537,508 B2 *   9/2013   Faxvog .................... H02H 3/52
                                                                361/35
8,878,396 B2 *  11/2014   Faxvog .................... H02H 3/52
                                                                307/126

(Continued)

OTHER PUBLICATIONS

International Search Report and Written Opinion for Application No. PCT/US2016/012358 dated Jun. 15, 2016.

*Primary Examiner* — Thienvu Tran
*Assistant Examiner* — Nicolas Bellido
(74) *Attorney, Agent, or Firm* — Merchant & Gould P.C.

(57) ABSTRACT

A control device for an electrical protection circuit for use in an alternating current system including a transformer is disclosed. An example system includes a first measurement probe, a second measurement probe configured to measure an electrical property within the electrical protection circuit, and a control module, including a processing device. The control module is configured to monitor a measurement from the first measurement probe and transmit a protection activation control signal to the switch assembly based on the measurement from the first measurement probe exceeding a first predetermined threshold. The control module is also configured to monitor a measurement from the second measurement probe and transmit a protection deactivation control signal to the switch assembly based on the measurement from the second measurement probe satisfying a second predetermined threshold.

19 Claims, 14 Drawing Sheets

(51) Int. Cl.
*H02H 3/20* (2006.01)
*H02H 3/50* (2006.01)
*H02H 5/00* (2006.01)

(58) Field of Classification Search
CPC ............ H02H 9/046; H02H 3/08; H02H 3/20;
H02H 3/50; H02H 5/005; H02H 7/04;
H02H 5/00; H02H 3/205; G01R 31/1272
See application file for complete search history.

(56) References Cited

U.S. PATENT DOCUMENTS

| | | | | |
|---|---|---|---|---|
| 2013/0285671 | A1* | 10/2013 | Hoffman | G01R 31/027 |
| | | | | 324/547 |
| 2013/0308229 | A1* | 11/2013 | Faxvog | H02H 7/04 |
| | | | | 361/35 |
| 2015/0311697 | A1* | 10/2015 | Faxvog | H02H 7/04 |
| | | | | 361/35 |

* cited by examiner

SYSTEMS AND METHODS FOR ACTUATING A TRANSFORMER NEUTRAL BLOCKING SYSTEM

CROSS REFERENCE TO RELATED APPLICATION

The present application claims priority to U.S. Ser. No. 62/100,395, titled SYSTEMS AND METHODS FOR ACTUATING A TRANSFORMER NEUTRAL BLOCKING CIRCUIT, filed on Jan. 6, 2015, the disclosure of which is hereby incorporated by reference in its entirety.

TECHNICAL FIELD

The present application relates generally to systems and methods for actuating a transformer neutral blocking circuit.

BACKGROUND

Electrical equipment, and in particular electrical equipment operating using alternating current, is subject to varying input signals and conditions. In typical arrangements, alternating current devices in the United States expect to receive a 60 Hz power line source (or 50 Hz in Europe) having a predetermined magnitude (e.g., 120 Volts). Although these power sources may vary somewhat, devices made for use with a particular current can typically handle some slight variation in the power signal received.

In some cases, a power signal can vary widely due to harmonics or other external conditions. Harmonics and quasi-DC currents can be the result of, for example, Geomagnetic (Solar) storms or other electrical equipment, such as switching power supplies, arc equipment, welding equipment, etc., which are on the same power grid or local power circuit. Harmonics and quasi-DC currents can cause the input voltage and current (and resulting power) of a power signal to vary dramatically, causing a potential for damage to electrical equipment connected to that power source.

For example, it is widely recognized that geomagnetic disturbances (GMD) such as geomagnetic storms or the E3 pulse associated with a high altitude electromagnetic pulse (HEMP-E3) can induce DC or quasi-DC currents called Geomagnetic Induced Currents (GIC) or high altitude electromagnetic E3 pulse (HEMP-E3) induced currents in high voltage power generation, transmission, and distribution system components (e.g., power transmission lines, power transformers, etc.). These DC currents can cause half-cycle saturation in power transformer cores which in turn can result in excessive reactive power losses, heating, damage and/or failure of such transformers. In addition the half-cycle saturation can cause the generation of harmonics of the primary frequency (50 or 60 Hz). This harmonic content in turn can cause power system relays to trigger, which can decouple required power components. This in turn can result in the collapse of local or wide area portions of a power grid.

Over approximately the last two decades, several suggested approaches for reducing GIC or HEMP-E3 induced currents in power systems have been proposed. These solutions generally take one of a few forms. A first class of solutions uses a capacitive circuit to simultaneously provide the alternating current (AC) grounding path and a block for the induced DC currents. These solutions generally include a set of switches that allow switching between a normal grounded transformer connection and grounding through the capacitive circuit. These solutions can allow for unintentionally open grounding connections to the transformer neutral, or require expensive electronics for handling ground fault conditions. These capacitive circuit solutions may require readjustment of power system relay settings, as compared to current operational parameters.

A second class of solutions generally includes the continuous use of active components used to reduce potentially damaging GIC events from DC or quasi-DC currents in the transformer neutral to ground connection. These solutions typically require expensive power electronics, and are constantly active, such that any failure would render these systems unreliable.

A third class of solutions generally uses a resistive approach in which fixed value resistors are used to continuously reduce the DC current in the neutral to ground connection of a transformer; however in these approaches, the resistors typically must have a high resistance value and would only reduce, not eliminate the DC or quasi-DC neutral current. Additionally, during the installation of these classes of solutions a readjustment of the power system's relay settings may be required. As such, there exists no solution that provides a reliable, low cost protection circuit compatible with current power delivery systems.

For these and other reasons, improvements are desirable.

SUMMARY

In accordance with the following disclosure, the above and other issues may be addressed by the following:

In a first aspect, a control device for an electrical protection circuit for use in an alternating current system including a transformer is disclosed. The electrical protection circuit includes a switch assembly and is configured to operate in a first state and a second state based on the switch assembly. The second state provides a protection mode. An example system includes a first measurement probe, a second measurement probe configured to measure an electrical property within the electrical protection circuit, and a control module, including a processing device. The control module is configured to monitor a measurement from the first measurement probe and transmit a protection activation control signal to the switch assembly based on the measurement from the first measurement probe exceeding a first predetermined threshold. The control module is also configured to monitor a measurement from the second measurement probe and transmit a protection deactivation control signal to the switch assembly based on the measurement from the second measurement probe satisfying a second predetermined threshold.

In another aspect, a control device for an electrical protection circuit for use in an alternating current system including a transformer is disclosed. The control device includes a current probe configured to measure a current through an overvoltage protection device, and a control module, including a processing device. The control module is configured to monitor a measurement from the current probe to determine that the overvoltage protection device has triggered, and, upon the overvoltage protection device triggering, increment an overvoltage protection device trigger count. The control module is further configured to, upon the overvoltage protection device trigger count exceeding a predetermined count threshold, generate an alarm.

In yet another aspect, an electrical protection system for use in an alternating current system including a transformer is disclosed. The system includes a control module, including a processing device, configured to monitor a first received measurement corresponding to a first electrical property within an electrical protection circuit and transmit a protection activation control signal to a switch assembly of the electrical protection circuit based on the first received measurement satisfying a first predetermined threshold; and monitor a second received measurement corresponding to a second electrical property within the electrical protection circuit different from the first electrical property and transmit a protection deactivation control signal to the switch assembly based on the second received measurement satisfying a second predetermined threshold.

DETAILED DESCRIPTION

Figure 1:
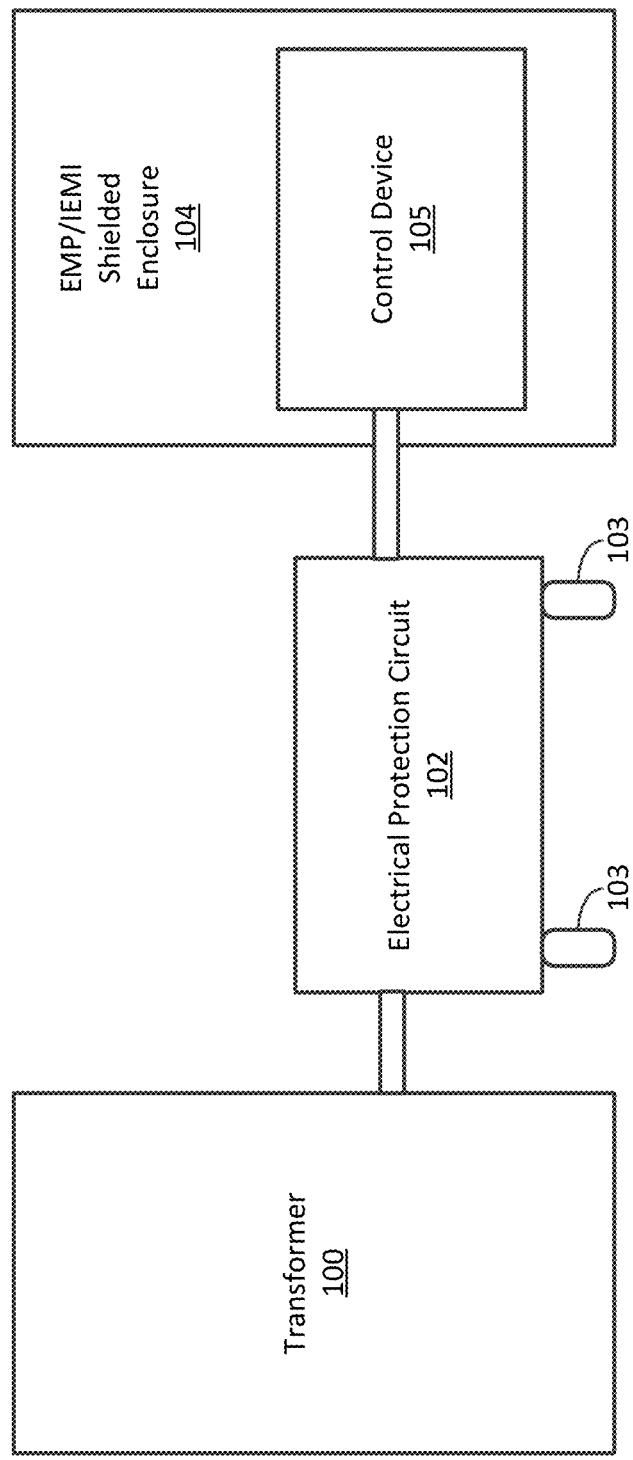
FIG. 1 is a schematic front plan view of a transformer protected using the methods and systems described herein.

In general, the present disclosure describes systems and methods for protecting power utility transformers and other electrical or electro-mechanical equipment from damaging quasi-DC currents and as a result harmonic content on a power line. Large quasi-DC neutral currents as well as powerline harmonic currents are the result of geomagnetic disturbances (GMD) such as geomagnetic (solar) storms, high altitude electromagnetic E3 pulse (HEMP-E3) or other electrical equipment, such as switching power supplies, arc welding equipment, plasma cutting equipment, electric discharge machining equipment, arc lamps, etc., which are on the same power grid or local power circuit. Overall, the present disclosure describes methods and systems for sensing the harmonic content of a 50 Hz or 60 Hz power line source, and/or potentially damaging neutral quasi-DC currents, to allow critical electrical equipment to be switched to a protective mode of operation in case such harmonics or quasi-DC currents are detected. Specifically, the present disclosure relates to the specific operation of a controller, and programming incorporated therein, which interfaces with a transformer neutral blocking system. In some embodiments, the transformer neutral blocking system comprises a transformer neutral blocking circuit. The programming described herein implements a series of tests based on observable characteristics of the transformer neutral blocking system and surrounding environment to determine whether and how to respond to potentially harmful voltage and current signals at the transformer, thereby protecting the transformer from damaging events, which can require replacement or costly repairs.

In accordance with various embodiments described herein, protection of high voltage power systems from GMD (e.g., solar storms) and HEMP-E3 pulses are achieved using a continuous alternating current (AC) grounding circuit that uses a switch-controlled DC current blocking mechanism for eliminating geomagnetic and HEMP-E3 pulse induced currents. A DC current blocking component (including one or more capacitors, resistors, or combinations thereof) is hard wired in place to provide an alternating current (AC) grounding path for the high voltage (HV) power systems, for example to the neutral of "Y" configuration HV transformers or autotransformers. Under normal operation a second parallel grounding path provides a very low impedance, standard grounding path through a closed switch assembly. An overvoltage protection device is connected in parallel with the transformer neutral to provide a grounding path should a ground fault occur in the power system while the neutral blocking system (or circuit) is in the GIC protective mode such as when a GMD or HEMP-E3 is detected. The GIC protective mode is an example of a protection mode.

The continuous grounding systems disclosed herein provides a grounding scheme that is compatible with standard transformer grounding schemes and hence will not require any changes to power system relay settings. When various conditions are detected, a switch assembly is opened or closed, thereby altering the operation of the circuit. For example, in some embodiments, when a high DC current is detected in the standard grounding path, the switch assembly is opened thereby blocking or attenuating the DC or quasi-DC current in the system. Blocking the DC or quasi-DC currents prevents half-cycle saturation of transformers and thereby protects them from excessive reactive power losses, overheating, and damage. Additionally, blocking the DC or quasi-DC currents prevents the generation of harmonics in half-cycle saturated transformers. Such power harmonics can potentially trip power system relays, which in turn can cause local or wide area power outages. Furthermore, in certain embodiments disclosed herein, the electrical protection systems included in such a continuous grounding system are designed (configured) to handle ground faults under either the normal or protective mode of operation.

Examples of such transformer neutral blocking circuits, as well as the environment in which such circuits may reside, are disclosed as and implementable within control circuits and control devices as disclosed in U.S. Pat. No. 8,537,508, and U.S. Pat. No. 8,878,396, the disclosures of which are incorporated by reference in their entirety.

FIG. 1 is a schematic front view of example electrical equipment protected according to features of the present disclosure, and a physical layout of certain components of the present disclosure. In the embodiment shown, a piece of electrical equipment, shown as a high-voltage transformer 100, is electrically connected to an electrical protection system 102. The electrical protection system 102 can, for example, include at least a portion of the devices described below, according to the embodiments shown in FIGS. 2-3. The high voltage transformer 100 may be mounted on a concrete pad for stability and isolation from the ground. An electrical protection system 102 is electrically connected to the high voltage transformer 100 as discussed above and placed on electrically grounded supports 103. In some embodiments, in addition to protecting against GIC events, all control electronics (semiconductor devices) are enclosed in an EMP/IEMI shielded and electrically filtered enclosure 104 that is electrically connected to the electrical protection system 102 and high voltage transformer 100, and control device 105. Some embodiments do not include the EMP/IEMI shielded and electrically filtered enclosure 104. It should be noted that in these embodiments the system is capable of protecting transformers against GIC and EMP E3 events but not against EMP E1 pulse threats.

Figure 2:
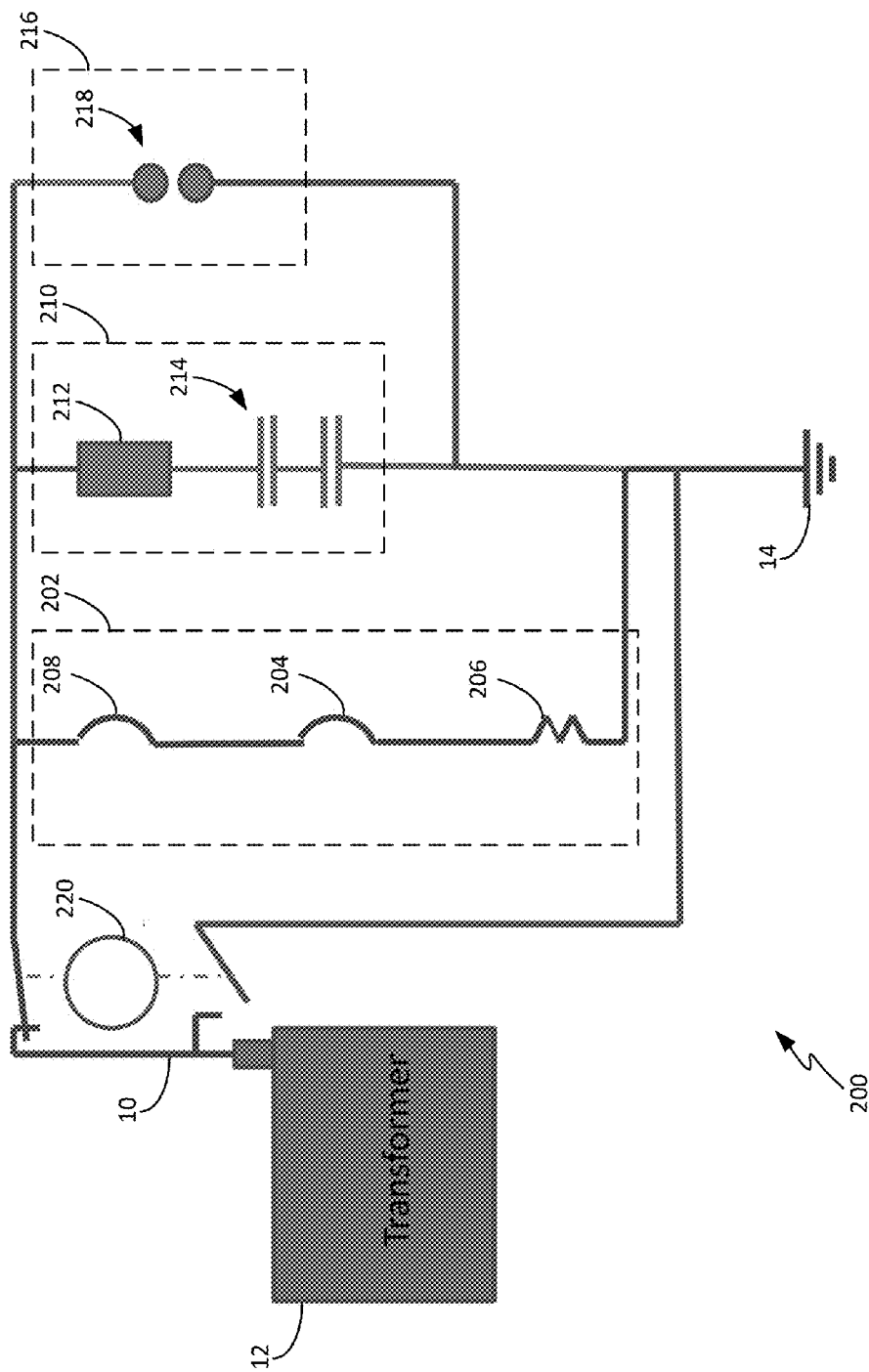
FIG. 2 illustrates an example embodiment of an electrical protection system useable within a continuous grounding system, according to a possible embodiment of the present disclosure, as installed at a power generation or distribution site.
Figure 3:
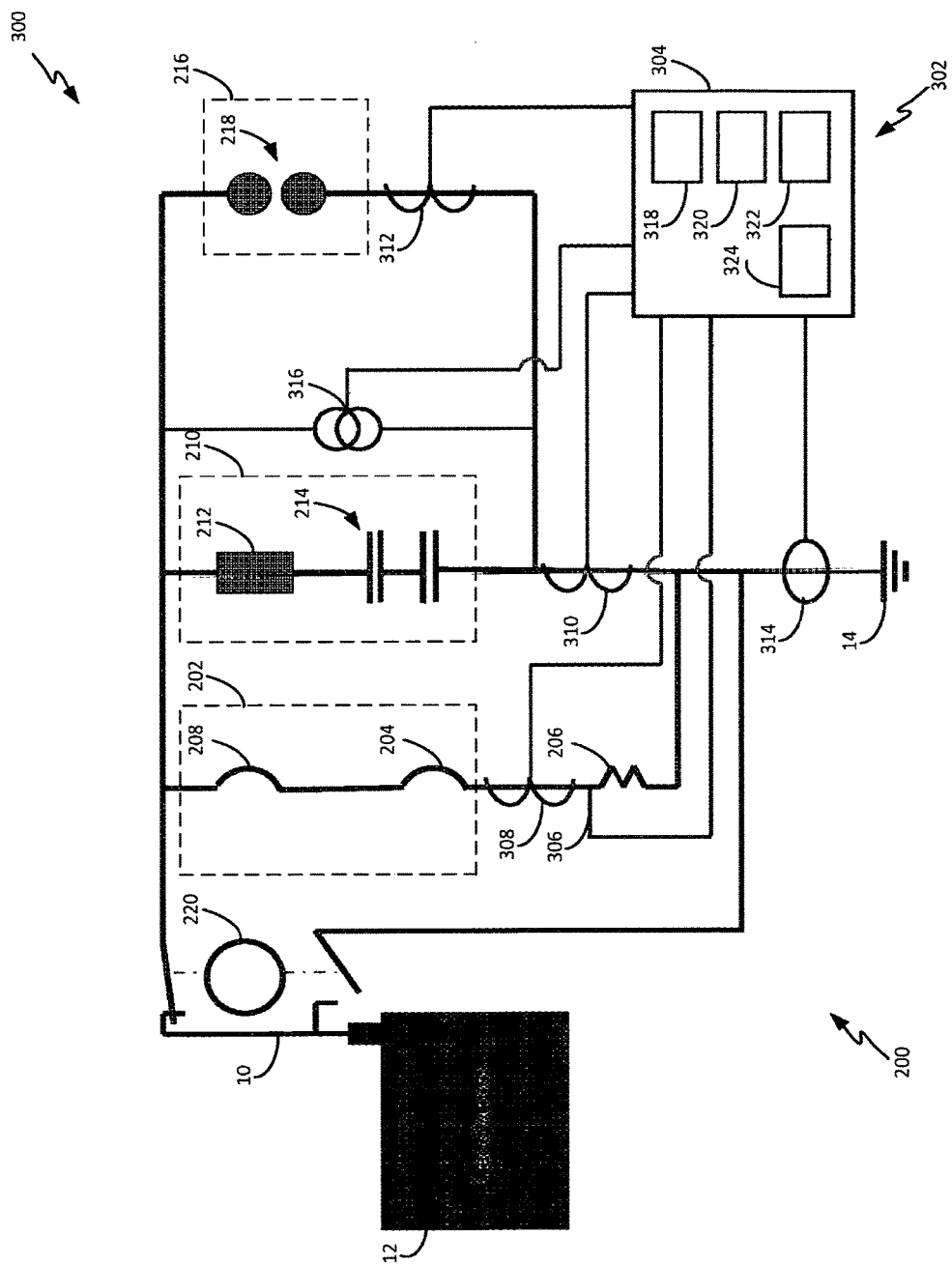
FIG. 3 illustrates a continuous grounding system including the example embodiment of an electrical protection system of FIG. 2 and a control device, according to a possible embodiment of the present disclosure.

In certain embodiments, the electrical protection system 102 includes the switch assemblies and DC current blocking components discussed in FIGS. 2-3, while the control device 105 contains sensing and switch actuation circuitry that operate to perform at least some of the processes described in FIGS. 4-14 herein; however, other arrangements of components for an electrical protection device can be provided.

Referring now to FIG. 2, an embodiment of an electrical protection circuit 200 is shown, according to the present disclosure. The electrical protection circuit 200 generally is connected between a transformer neutral 10 of a transformer 12 and an electrical ground 14. The electrical protection circuit 200 includes a switch assembly 202 including an electrically controlled DC switch 204 connected between the transformer neutral 10 and electrical ground 14. A shunt resistor 206 can be connected between the DC switch 204 and electrical ground 14, which can be used to sense DC current passing between the transformer neutral 10 and electrical ground 14. In certain embodiments, the shunt resistor 206 has a lower resistance, on the order of a few milliohms, to allow for a low impedance ground connection through the switches. In another embodiment, the shunt resistor 206 could be replaced by a Hall effect current sensor or other non-contact current sensor. Additionally, an electrically-controlled alternating current (AC) switch 208 can be connected between the transformer neutral 10 and the DC switch 204, for example to protect the DC switch 204 from high voltages during a ground fault event. As an example, one or both of the alternating current (AC) switch 208 and the DC switch 204 may comprise circuit breakers. In some embodiments, the electrical ground 14 can be connected to a station ground grid, while in other embodiments it can be connected to the transformer housing which is in turn grounded.

The DC switch 204 can be any of a variety of fast acting electrically-controlled switches, such as a high voltage circuit breaker switch. In the embodiment shown, the DC switch 204 is a normally-closed connection which can be opened rapidly via an electrical control input. Example sensing and control circuitry that can be connected to the control input is discussed further in connection with FIG. 3, below. In some embodiments, when the DC switch 204 opens, a signal from the DC switch 204 then opens the alternating current (AC) switch 208. Shortly thereafter, the DC switch 204 closes but the alternating current (AC) switch 208 remains open and protects the DC switch from any overvoltage on the neutral connection.

A DC current blocking component 210 is connected in parallel with the switch assembly 202 between the transformer neutral 10 and the electrical ground 14. As further explained in the examples below, the DC current blocking component 210 can include one or more direct current blocking devices (e.g., capacitors or resistors) capable of blocking a current path between the electrical ground 14 and the transformer neutral 10, to prevent damaging DC or quasi-DC ground currents in the transformer neutral 10, which would in turn cause possible damage to the transformer 12 or collapse of a power grid. In the example shown, the DC current blocking component 210 includes resistor 212 and capacitor banks 214. Although in certain embodiments a one or two Ohm impedance (60 Hz) capacitance bank is used, other types of capacitors could be used as well. However, depending on the specific application, either a capacitive or resistive (or some combination thereof) blocking device could be employed in the electrical protection circuit 200. Furthermore, the DC current blocking component 210 is hard wired to the electrical ground 14, therefore providing an alternating current (AC) ground for the transformer (or other power component) even if the DC switch 204 and alternating current (AC) switch 208 inadvertently malfunction.

In normal operation, the transformer neutral 10 is grounded through the switch assembly 202. That is, the switch assembly 202, including the DC switch 204 and the alternating current (AC) switch 208, is normally in a closed position. This corresponds to the standard grounding configuration used by utilities; consequently, a grounding system such as is disclosed herein does not require readjustments to the utility electrical equipment to which it is attached prior to use. In this first (or normal) mode of operation, the DC current blocking component 210 is not energized, because the switch assembly creates a short around it. If a ground fault is detected while operating in this normal operational mode (e.g., no GIC detected), the grounding through the switch assembly will handle the ground fault current until the power system relays isolate the faulted equipment. As described in greater detail with respect to FIG. 8, when the presence of various conditions are detected within the electrical protection circuit 200, the switch assembly is opened by the control device 105. In this second (or GIC protective) mode of operation the DC current blocking component 210 provides the alternating current (AC) grounding for the transformer neutral. This mode of operation protects against DC or quasi-DC currents associated with either GMD and HEMP-E3 events. This protective mode remains operational until the control device 105 closes the switch assembly 202 as described in greater detail at least with respect to FIG. 11.

In some embodiments, to account for the extremely unlikely event that a GMD (or HEMP-E3) and a ground fault occur simultaneously, an overvoltage protection device 216 is included in parallel with the switch assembly 202 and the DC current blocking component 210. In some embodiments, the overvoltage protection device 216 is configured to trigger at a voltage that is below the voltage level that would damage either the transformer 100 or the DC current blocking component 210. In this manner, the overvoltage protection device 216 operates to protect the DC current blocking component 210 from potentially damaging voltages when the electrical protection circuit 200 is operating in the GIC protective mode. In some embodiments, the switch assembly 202 is then reclosed by a signal from the control device 105 based on detecting a current passing through the overvoltage protection device 216. Therefore the overvoltage protection device 216 provides the initial grounding within one cycle of the ground fault and until the switch assembly 202 can be reclosed.

In this example, the overvoltage protection device 216 includes a triple spark gap 218. Examples of triple spark gaps are described in U.S. Ser. No. 14/185,458, filed on Feb. 20, 2014 and titled OVERVOLTAGE PROTECTION FOR POWER SYSTEMS, the disclosure of which is hereby incorporate by reference in its entirety. In other embodiments, the overvoltage protection device 216 comprises a single spark gap. Further, in some embodiments, the overvoltage protection device 216 may comprise a surge arresting component disclosed in U.S. Ser. No. 14/185,458, a varistor, etc. In some embodiments, the control device 105 counts the number of events in which the overvoltage protection device 216 has operated to determine when inspection or replacement is required. Examples are described in greater detail with respect to FIGS. 6 and 13.

In some embodiments, a maintenance bypass switch 220 is included that operates to deactivate the electrical protection circuit 200 by connecting the transformer neutral 10 directly to electrical ground 14. Examples of maintenance bypass switch 220 include trapped key interlocks such as kirk key interlocks. In this manner, the electrical protection circuit 200 may be removed from operation for inspection, maintenance, repair, etc.

By opening the switch assembly, the DC current blocking component 210 shown in FIG. 2 provides the alternating current (AC) grounding path for the transformer neutral 10, while at the same time blocking the DC or quasi-DC currents induced by a geomagnetic storm or HEMP-E3 event. Blocking the quasi-DC currents protects the transformer 12 from entering half-cycle saturation which in-turn can cause transformer excessive reactive power losses, overheating, damage, or even failure. Additionally, blocking the quasi-DC current also prevents the generation of harmonics in the power system which in-turn can prevent the tripping of relays, the disconnection of power compensation components, excessive reactive power burden, and potentially the collapse of either small or large portions of the power grid.

Further, to increase the reliability of the DC current blocking component 210, either a parallel bank of multiple capacitors or resistors could be used such that if one or more of these capacitors or resistors fail the others would still be available as blocking components.

Additionally, to protect against the E1 and E2 portions of a high altitude electromagnetic pulse (HEMP) and/or Intentional Electromagnetic Interference (IEMI), some or all of the sensitive sensing and control electronics of such a system can be placed in a shielded and electrically filtered enclosure, such as the enclosure 104 containing control device 105 of FIG. 1. In some embodiments, only components that do not contain sensitive semiconductor electronics are not housed in the enclosure 104 and hence would survive either an EMP or IEMI event. In an alternative embodiment where the control device 105 is not placed in a shielded and electrically filtered enclosure, the transformer will still be protected against geomagnetic and HEMP E3 induced currents. Additional details regarding the contents of such an enclosure are discussed in further detail below.

It is noted that alternative embodiments of such an electrical protection circuit 200 may be utilized as well, in different embodiments of the present disclosure. Example embodiments are further described in U.S. Pat. Nos. 8,878, 396 and 8,537,508, the disclosures of which are hereby incorporated by reference in their entireties.

Referring now to FIG. 3, a continuous grounding system 300 is shown including the electrical protection circuit 200, according to a possible embodiment of the present disclosure. The continuous grounding system 300 also includes a control device 302, in accordance with a possible embodiment of the present disclosure. The control device 302 includes control electronics, such as a control module 304, as well as one or more sensing devices. In the example shown, the control device 302 includes the following sensing devices: a GIC measurement device 306, a current transformer (CT) 308, a current transformer (CT) 310, a current transformer (CT) 312, a neutral current sensor 314, and a voltage probe 316. Some embodiments include more, fewer, or different sensing devices. In some embodiments, the neutral current sensor 314 is a Rogowski Coil. The above mentioned GIC measurement devices, current transformers, and current sensors are example of current probes. The above mentioned sensing devices, including the current probes and voltage probes, are examples of measurement probes.

In some embodiments, the control module 304 comprises a special purpose computing device that operates to receive signals from the various sensing devices, continuously perform various tests based, at least in part, on the received signals, and control the switch assembly 202. An example special purpose computing device is the SEL Axion® Distributed Control and Integration Platform from Schweitzer Electronics Laboratory of Pullman, Wash. In the example shown, the control module 304 includes a processing device 318, a memory device 320, an alarm device 322, and a switch control device 324. Some embodiments include additional components as well such as a network interface device that operates to communicate with other computing devices over one or more networks.

The processing device 318 includes one or more physical integrated circuits that selectively execute instructions such as software instructions. In various embodiments, the processing device 318 is implemented in various ways. For instance, in one example embodiment, the processing device 318 is implemented as one or more processing cores. For instance, in this example embodiment, the processing device 318 may be implemented as one or more Intel Core 2 microprocessors. In another example embodiment, the processing device 318 is implemented as one or more separate microprocessors. In yet another example embodiment, the processing device 318 is implemented as an ASIC that provides specific functionality. In yet another example embodiment, the processing device 318 provides specific functionality by using an ASIC and by executing software instructions. Additionally, in some embodiments the processing device 318 comprises a digital signal processor. In different embodiments, the processing device 318 executes software instructions in different instruction sets. For instance, in various embodiments, the processing device 318 executes software instructions in instruction sets such as the x86 instruction set, the POWER instruction set, a RISC instruction set, the SPARC instruction set, the IA-64 instruction set, the MIPS instruction set, and/or other instruction sets. For example, the processes illustrated and described with respect to FIGS. 4-14 may be executed by the processing device 318 as software instructions.

The memory device 320 includes one or more computer-readable data storage media capable of storing data or instructions or both. In different embodiments, the memory device 320 is implemented in different ways. For instance, in various embodiments, the memory device 320 is implemented using various types of computer-readable data storage media. Example types of computer-readable data storage media include, but are not limited to, dynamic random access memory (DRAM), double data rate synchronous dynamic random access memory (DDR SDRAM), reduced latency DRAM, DDR2 SDRAM, DDR3 SDRAM, Rambus RAM, solid state memory, flash memory, read-only memory (ROM), electrically-erasable programmable ROM, and other types of devices and/or articles of manufacture that store data. In some embodiments, the memory device 320 includes non-transitory media.

The alarm device 322 operates to generate an alarm in response to an alarm condition. In some embodiments, the alarm device 322 transmits a message to a remote computing device such as a supervisory control and data acquisition (SCADA) system in response to an alarm condition. In some embodiments, the alarm device 322 supports multiple alarm severity levels (e.g., minor alarm and major alarm) and operates differently according to the severity level of a particular alarm condition. Additionally, in some embodiments the alarm device 322 operates to log alarm conditions, such as to a file, database table, or memory location.

The switch control device 324 operates to control the switch assembly 202. In at least some embodiments, the switch control device 324 comprises a relay that opens and closes the DC switch 204.

Referring generally now to FIGS. 4-14, various test processes that are performed by embodiments of the control device 302 to monitor and operate the electrical protection circuit 200 are described. In some embodiments, all of the test processes illustrated in FIGS. 4-14 are performed continuously and simultaneously (in parallel) during operation of the system 300. However, other embodiments, include fewer, different, or additional test processes. Additionally, in some embodiments, not all of the test processes are performed continuously and simultaneously. For example, in some embodiments, at least one of the test processes is performed on intervals.

Figure 4:
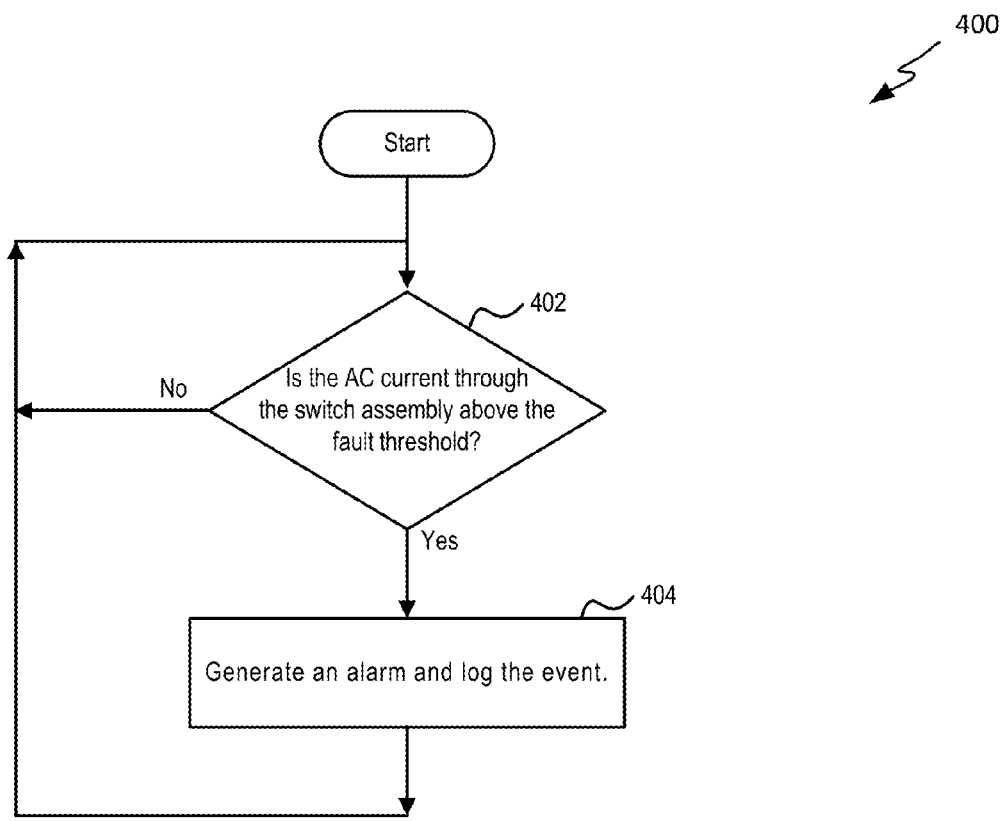
FIG. 4 illustrates an example process for detecting a ground fault and logging the ground fault event while the system of FIG. 3 is operating in a normal mode, according to a possible embodiment of the present disclosure.

Referring now to FIG. 4, an example test process 400 performed by some embodiments of the control device 302 is illustrated. The test process 400 operates to detect a ground fault and log the ground fault event while the system 300 is operating in the normal mode. For example, the test process 400 tests the transformer neutral alternating current (AC) for ground fault events. Operation 402 determines whether the alternating current (AC) through the switch assembly 202 as measured by the current transformer 308 exceeds a predetermined fault threshold for one cycle (e.g., approximately 20 or 17 milliseconds at 50 or 60 Hz). In some embodiments, the predetermined threshold is 5,000 amps. If the current exceeds the threshold, the process continues to operation 404 where an alarm is generated and the event is logged as a ground fault as shown in FIG. 4. In at least some embodiments, no other actions are taken at operation 404 as the energy is directed to ground through the closed switches of the switch assembly 202, giving the system a metallic path to ground. If the current does not exceed the threshold, the process repeats operation 402 to continuously monitor the electrical protection circuit 200. Similarly, after completion of operation 404, the process 400 also returns to operation 402 so as to perform continuous monitoring of the electrical protection circuit 200.

Figure 5:
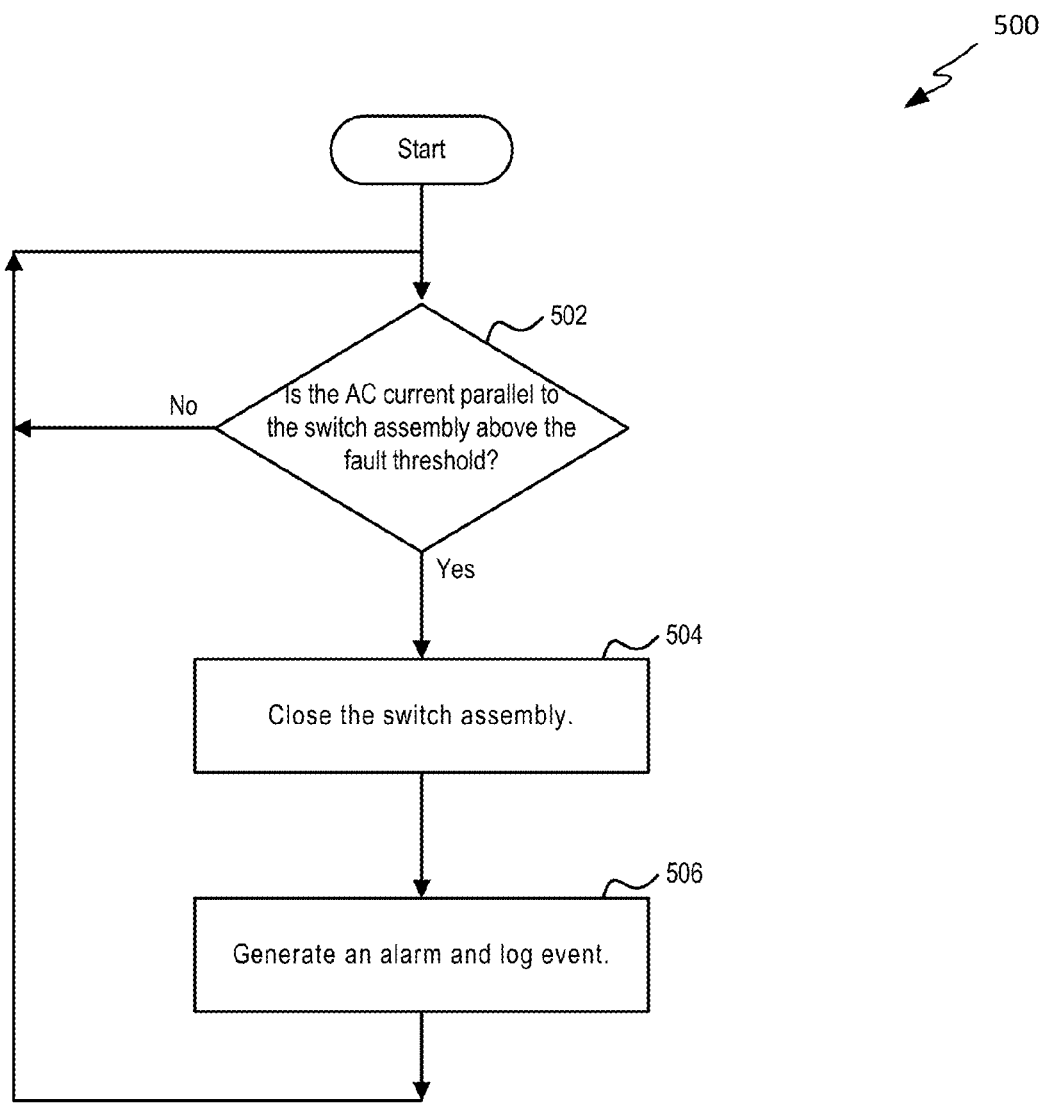
FIG. 5 illustrates an example process for detecting ground faults while the system of FIG. 3 is operating in the GIC protective mode, according to a possible embodiment of the present disclosure.

Referring now to FIG. 5, an example test process 500 performed by some embodiments of the control device 302 is illustrated. The test process 500 operates to detect a ground fault while the system 300 is operating in the GIC protective mode and, in response to detecting a ground fault, to close the switch assembly 202 and log the ground fault event. For example, the test process 500 tests the transformer neutral alternating current (AC) for ground fault events when the switch assembly 202 is open. At operation 502, it is determined whether the alternating current (AC) running parallel to the switch assembly 202 as measured by the current transformer (CT) 310 exceeds a predetermined fault threshold for one cycle. In some embodiments, the predetermined threshold is 5,000 amps. If the current exceeds the threshold, the process continues to operation 504 where a signal is sent to close the switch assembly 202 (e.g., via switch control device 324) thereby giving the system 300 a metallic path to ground and returning the system 300 to the normal mode of operation. At operation 506, an alarm is generated and the event is logged as a ground fault. Alternatively, if the current does not exceed the threshold at operation 502, the process repeats operation 502 to continuously monitor the electrical protection circuit 200. Similarly, after completion of operation 506, the process 500 also returns to operation 502 so as to perform continuous monitoring of the electrical protection circuit 200.

Figure 6:
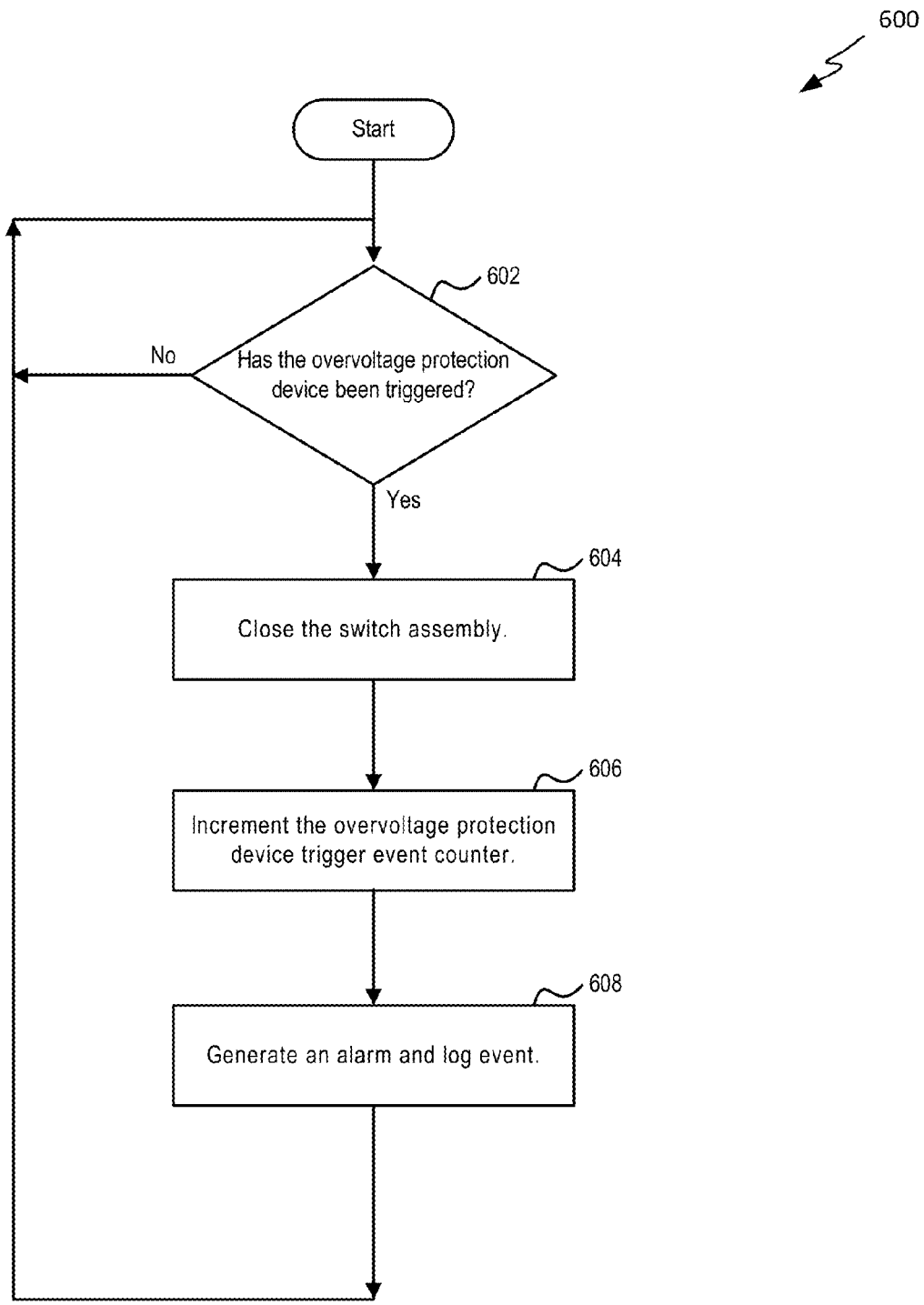
FIG. 6 illustrates an example process for detecting when the overvoltage protection device of FIG. 2 is triggered, according to a possible embodiment of the present disclosure.

Referring now to FIG. 6, an example test process 600 performed by some embodiments of the control device 302 is illustrated. The test process 600 operates to detect when the overvoltage protection device 216 is triggered, such as when a higher voltage ground fault occurs while the system 300 is operating in the GIC protective mode. At operation 602, it is determined whether the overvoltage protection device 216 has been triggered or operated based on whether the current measured at current transformer 312 exceeds a predetermined trigger threshold for one cycle. In some embodiments, the predetermined threshold is 5,000 amps. If the current exceeds the threshold, the process continues to operation 604 where a signal is sent to close the switch assembly 202 thereby giving the system 300 a metallic path to ground and returning the system 300 to normal mode. At operation 606, a counter of overvoltage protection device trigger events is incremented. In some embodiments, the counter is used to determine when repair or maintenance may be needed on the overvoltage protection device 216. At operation 608, an alarm is generated. In some embodiments, the event is logged as well. Alternatively, if the current does not exceed the threshold at operation 602, the process repeats operation 602 to continuously monitor the electrical protection circuit 200. Similarly, after completion of operation 608, the process 600 also returns to operation 602 so as to perform continuous monitoring of the electrical protection circuit 200.

Figure 7:
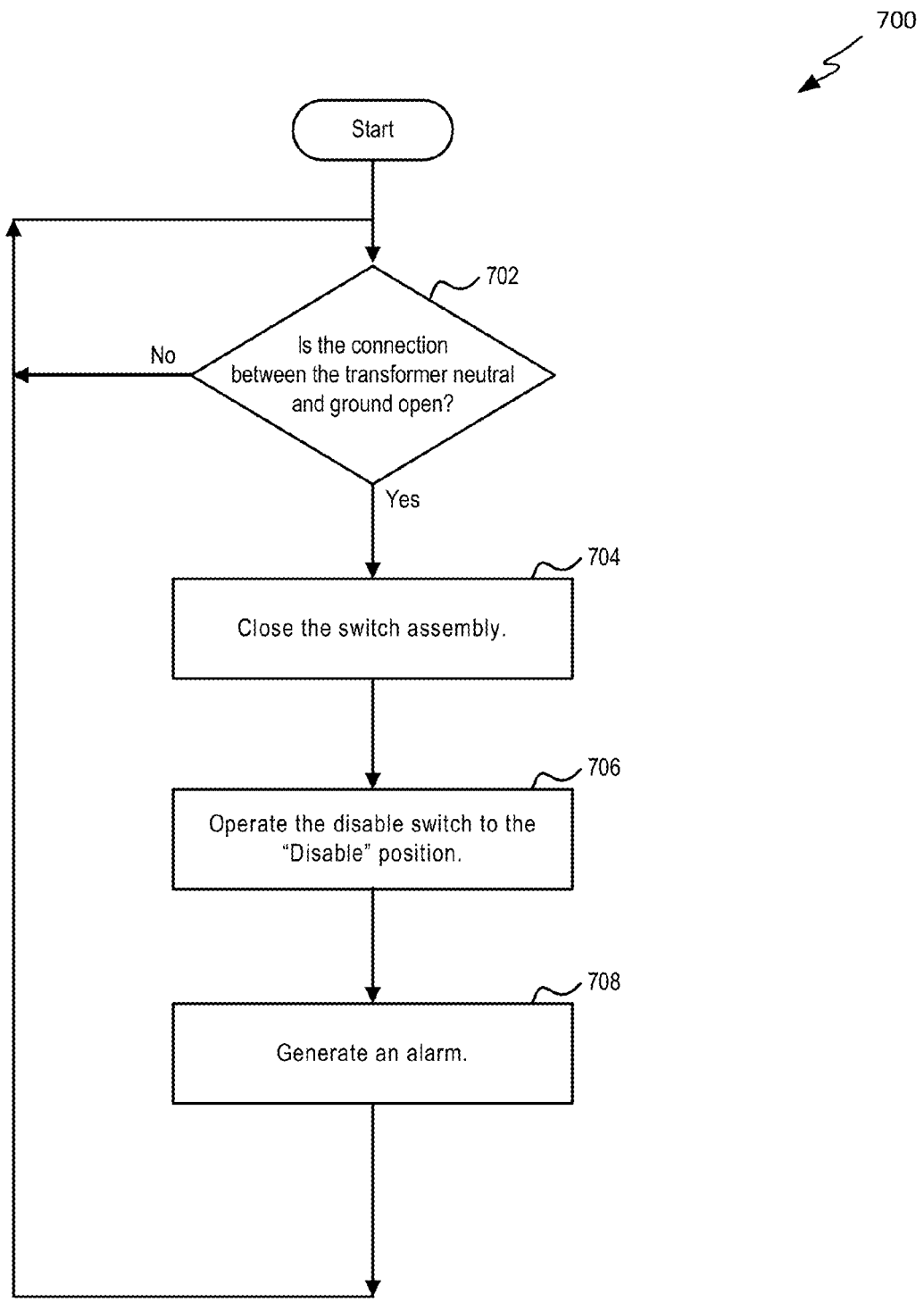
FIG. 7 illustrates an example process for detecting an open connection between the transformer neutral and the ground, according to a possible embodiment of the present disclosure.

Referring now to FIG. 7, an example test process 700 performed by some embodiments of the control device 302 is illustrated. The test process 700 operates to detect an open connection between the transformer neutral 10 and the electrical ground 14. For example, in some embodiments, the imbalance alternating current (AC) in the neutral connection 10 of the transformer 12 is continuously monitored to detect an open neutral connection. In some embodiments, this condition occurs when the switch assembly 202 is stuck open and the DC current blocking component 210 is an open connection (e.g., the DC current blocking component 210 or a component thereof such as a resistor or capacitor is damaged), or the maintenance bypass switch 220 was improperly operated. This condition triggers an alarm so that an operator can inspect the system and take correction action(s).

At operation 702 it is determined when the connection between the transformer neutral 10 and the electrical ground 14 is open. In some embodiments, it is determined that the connection is open when the imbalance alternating current (AC) measured by the neutral current sensor 314 is below a predetermined current threshold for a predetermined time period. In some embodiments, the current threshold is 0.5 amps and the time period is 60 seconds. In other embodiments, other current thresholds and time thresholds are also possible.

If it is determined that the connection is open, the process continues to operation 704 where a signal is sent to attempt to close the switch assembly 202 thereby giving the system 300 a metallic path to ground and returning the system 300 to normal mode. At operation 706, a disable switch is operated to the disable position. In some embodiments, the system 300 will not enter the GIC protective mode when the disable switch is set to disable. Beneficially, the disable switch can be used to disable the protective mode when measurements indicate that the components used in the protective mode are not operational. At operation 708, an alarm is generated. In some embodiments, a major alarm is generated at operation 708. Additionally, in some embodiments, the event is logged as well.

Alternatively, if it is not determined that the transformer neutral connection is open at operation 702, the process repeats operation 702 to continuously monitor the electrical protection circuit 200. Similarly, after completion of operation 708, the process 700 also returns to operation 702 so as to perform continuous monitoring of the electrical protection circuit 200.

Figure 8:
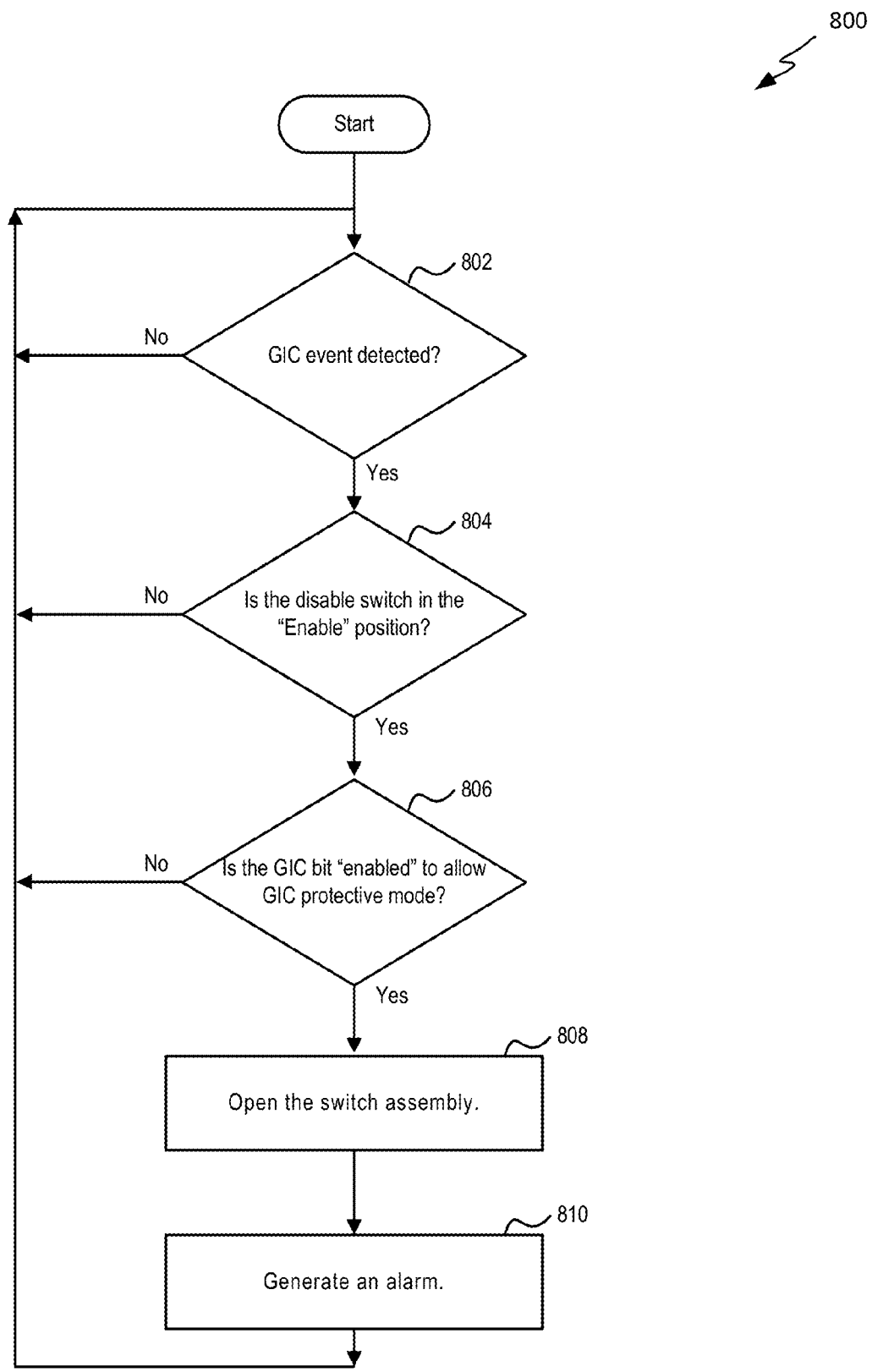
FIG. 8 illustrates an example process for detecting a GIC event and causing the electrical protection system of FIG. 2 to operate in the GIC protective mode, according to a possible embodiment of the present disclosure.

Referring now to FIG. 8, an example test process 800 performed by some embodiments of the control device 302 is illustrated. The test process 800 operates to detect a DC current indicating a GIC or HEMP-E3 current and cause the electrical protection circuit 200 to operate in the GIC protective mode. In at least some embodiments, a GIC event is detected based on detecting a neutral DC or quasi-DC or total harmonic distortion (THD) exceeding preset values, or by a measurement of the earth's magnetic field indicating a GIC event above a preset threshold, or a high electromagnetic field measurement indicating a HEMP-E1 event. Such measurements may be taken, for example, from a substation that the transformer being protected is located in, e.g., at potential transformers installed to provide a signal for a voltage THD or current transformers for current THD. Such voltage or current THD could be retrieved by a probe of the control device 302. Additionally, a trigger could come from a separate measurement device, such as a high field electromagnetic detector, to initiate protection for a HEMP-E1 event, or a magnetometer for a solar event. An example of such a detector is disclosed in U.S. Pat. No. 8,773,107, the disclosure of which is incorporated by reference in its entirety.

At operation 802, it is determined whether a GIC event is being detected based on comparing measurements captured by the GIC measurement device 306 at the shunt resistor 206 to predetermined threshold values. In some embodiments, the range of predetermined threshold values of DC or quasi-DC current is 0.5-5 amps and the range of the predetermined threshold value for power harmonic levels are expected to be in the range of about 1% to 10% total harmonic distortion (THD). In some embodiments, if either the predetermined threshold value for DC or quasi-DC or the predetermined threshold value for harmonic levels is exceeded, it is determined that a GMD event is occurring.

If it is determined that a GMD event is occurring, the process continues to operation 804, where the disable switch is checked to see whether the disable switch is the enable position. If the disable switch is in the enable position, the process continues to operation 806, where a GIC bit is checked to see whether the system 300 is allowed to enter GIC protective mode. If the GIC bit is enabled, the process continues to operation 808, where a signal is sent to open the switch assembly 202 thereby causing the DC current blocking component 210 to serve as the alternating current (AC) grounding path for the electrical protection circuit 200 and switching the system 300 to the GIC protective mode. The DC current blocking component 210 blocks the DC or quasi-DC current generated by the GIC event and thereby protects the transformer 12 and the capacitor bank 214. In some embodiments, the signal is sent by the switch control device 324 to open the DC switch 204, which in turn may cause the alternating current (AC) switch 208 to open as well. In some embodiments, the DC switch 204 is reclosed after 0.20 seconds.

At operation 810, an alarm is generated. In some embodiments, a minor alarm is generated at operation 810. Additionally, in at least some embodiments, the event is logged.

Alternatively, if it is not determined that a GMD event is detected at operation 802, the disable switch is not in the enable position at operation 804, or the GIC bit is not enabled at operation 806, the process returns to operation 802 to continuously monitor the electrical protection circuit 200. Similarly, after completion of operation 810, the process 800 also returns to operation 802 so as to perform continuous monitoring of the electrical protection circuit 200.

Figure 9:
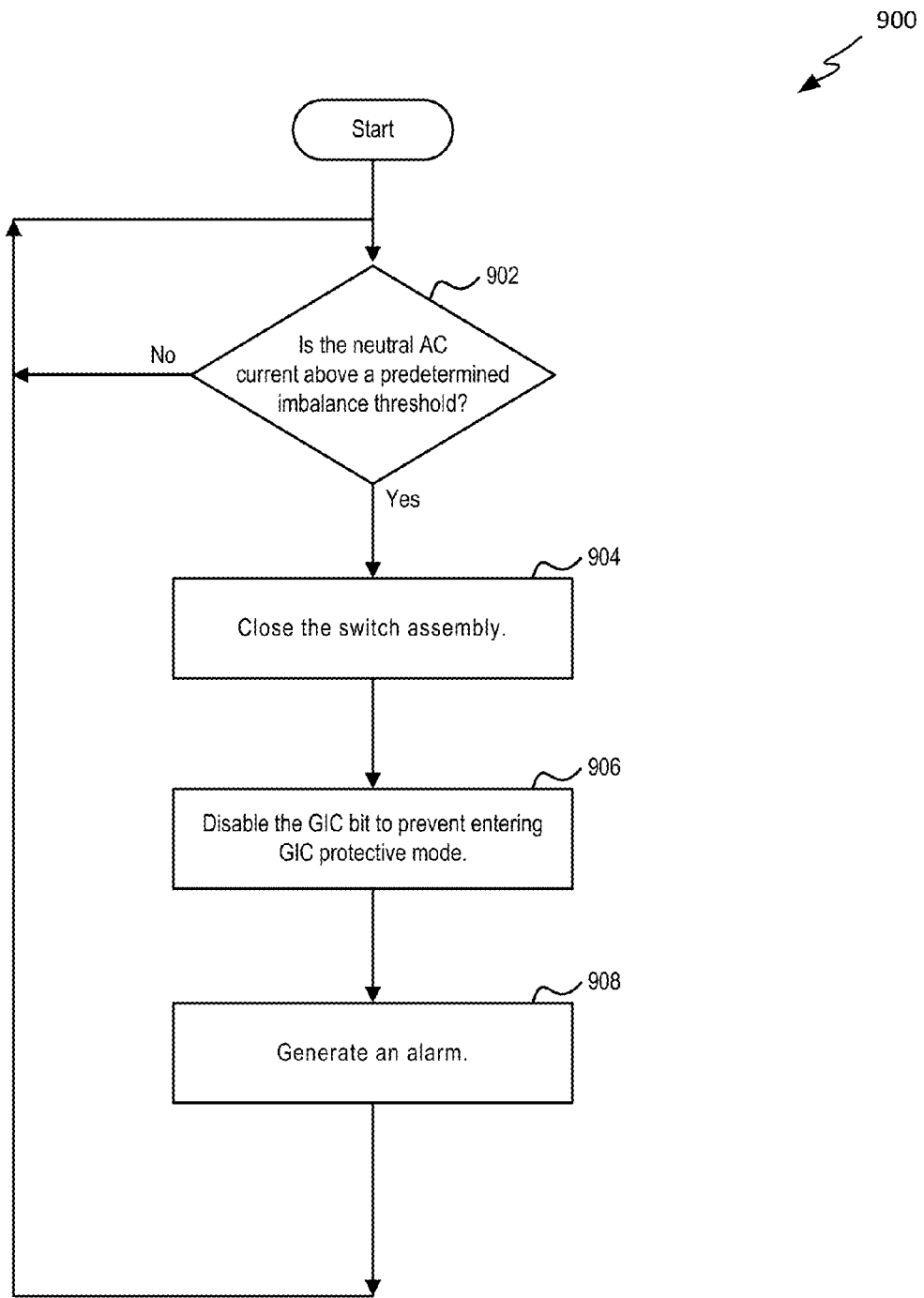
FIG. 9 illustrates an example process for detecting a potentially damaging imbalance alternating current (AC) in the transformer neutral, according to a possible embodiment of the present disclosure.

Referring now to FIG. 9, an example test process 900 performed by some embodiments of the control device 302 is illustrated. The test process 900 operates to detecting an imbalance alternating current (AC) in the transformer neutral 10, which potentially could damage the DC current blocking component 210. At operation 902, it is determined whether the neutral alternating current (AC) as measured by either current transformer 308 or current transformer 310 exceeds a predetermined imbalance current threshold for a predetermined time period. In some embodiments, the predetermined imbalance current threshold is 150 amps and the predetermined time period is 10 seconds. However, other embodiments could use other thresholds.

If the current exceeds the threshold, the process continues to operation 904 where a signal is sent to close the switch assembly 202 thereby giving the system 300 a metallic path to ground and returning the system 300 to normal mode (if it was in GIC protective mode). At operation 906, the GIC bit is set to disable to prevent the system 300 from entering the GIC protective mode. In some embodiments, the GIC bit remains disabled for at least five minutes. At operation 908, an alarm is generated. In some embodiments, a minor alarm is generated at operation 908. In some embodiments, the event is logged as well. Alternatively, if the current does not exceed the threshold at operation 902, the process repeats operation 902 to continuously monitor the electrical protection circuit 200. Similarly, after completion of operation 908, the process 900 also returns to operation 902 so as to perform continuous monitoring of the electrical protection circuit 200.

Figure 10:
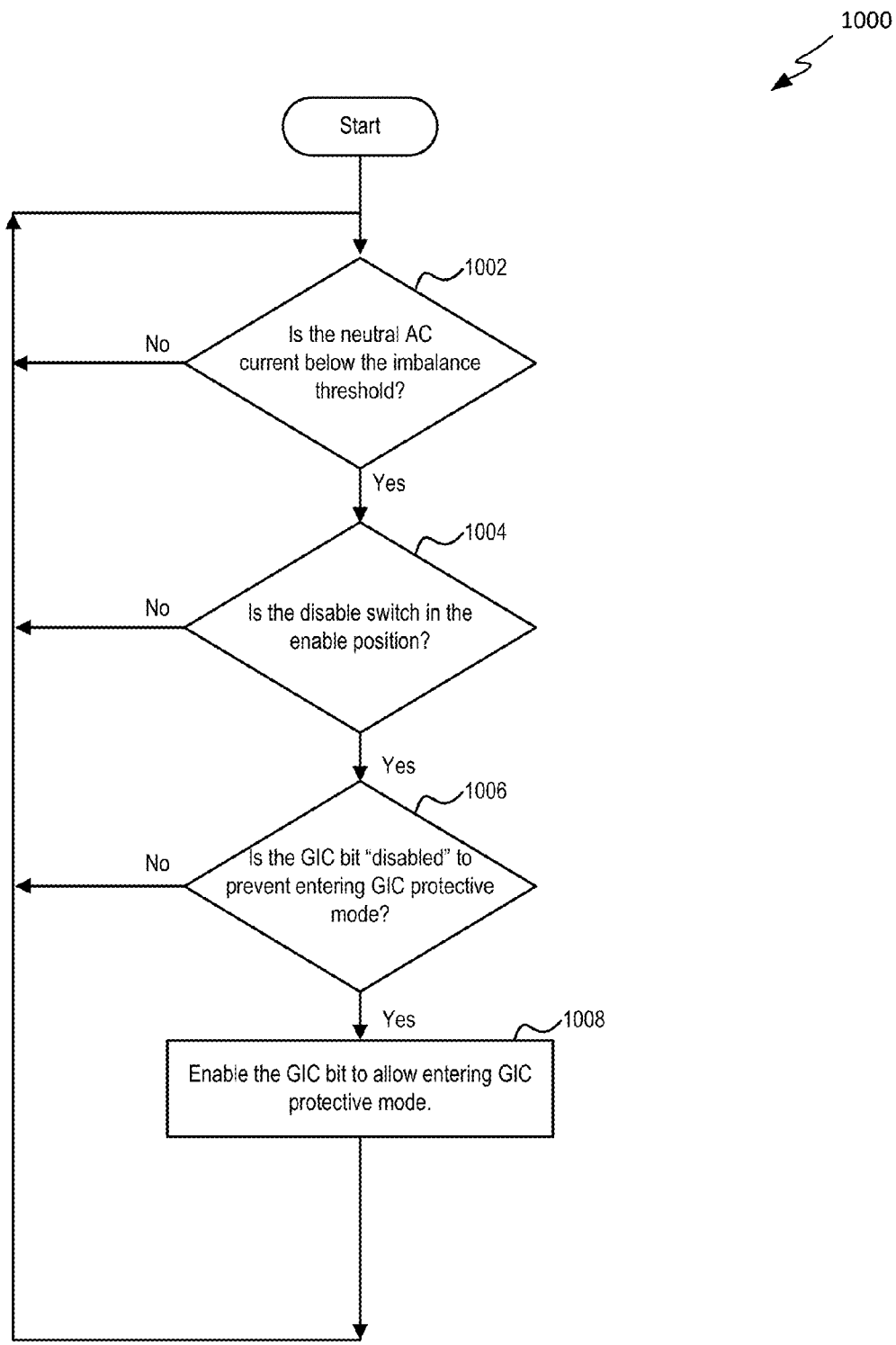
FIG. 10 illustrates an example process for ensuring imbalance alternating current (AC) in the transformer neutral is below levels that could damage the DC current blocking component of FIG. 2, according to a possible embodiment of the present disclosure.

Referring now to FIG. 10, an example test process 1000 performed by some embodiments of the control device 302 is illustrated. The test process 1000 operates to ensure the imbalance alternating current (AC) in the transformer neutral 10 is below levels that could damage the DC current blocking component 210. At operation 1002, it is determined whether the neutral alternating current (AC) as measured by the current transformer 308 is below a predetermined imbalance current threshold for a predetermined time period. In some embodiments, the predetermined imbalance current threshold is 125 amps and the predetermined time period is 300 seconds. However, other embodiments use other thresholds.

If the neutral alternating current (AC) is below the imbalance current threshold, the process continues to operation 1004, where it is determined whether the disable switch is in the enable position. If the disable switch is in the enable position, the process continues to operation 1006, where it is determined whether the GIC bit is currently disabled to prevent entering the GIC protective mode. If the GIC bit is disabled, the process continues to operation 1008, where the GIC bit is enabled to allow the system 300 to enter the GIC protective mode. In some embodiments, the event is logged as well.

Alternatively, if the current is determined to be above the imbalance threshold at operation 1002, the disable switch is determined to be in the disabled position at operation 1004, or the GIC bit is determined to not be disabled at operation 1006, then the process 1000 returns to the operation 1002 to continuously monitor the electrical protection circuit 200. Similarly, after completion of operation 1008, the process 1000 also returns to operation 1002 so as to perform continuous monitoring of the electrical protection circuit 200.

Figure 11:
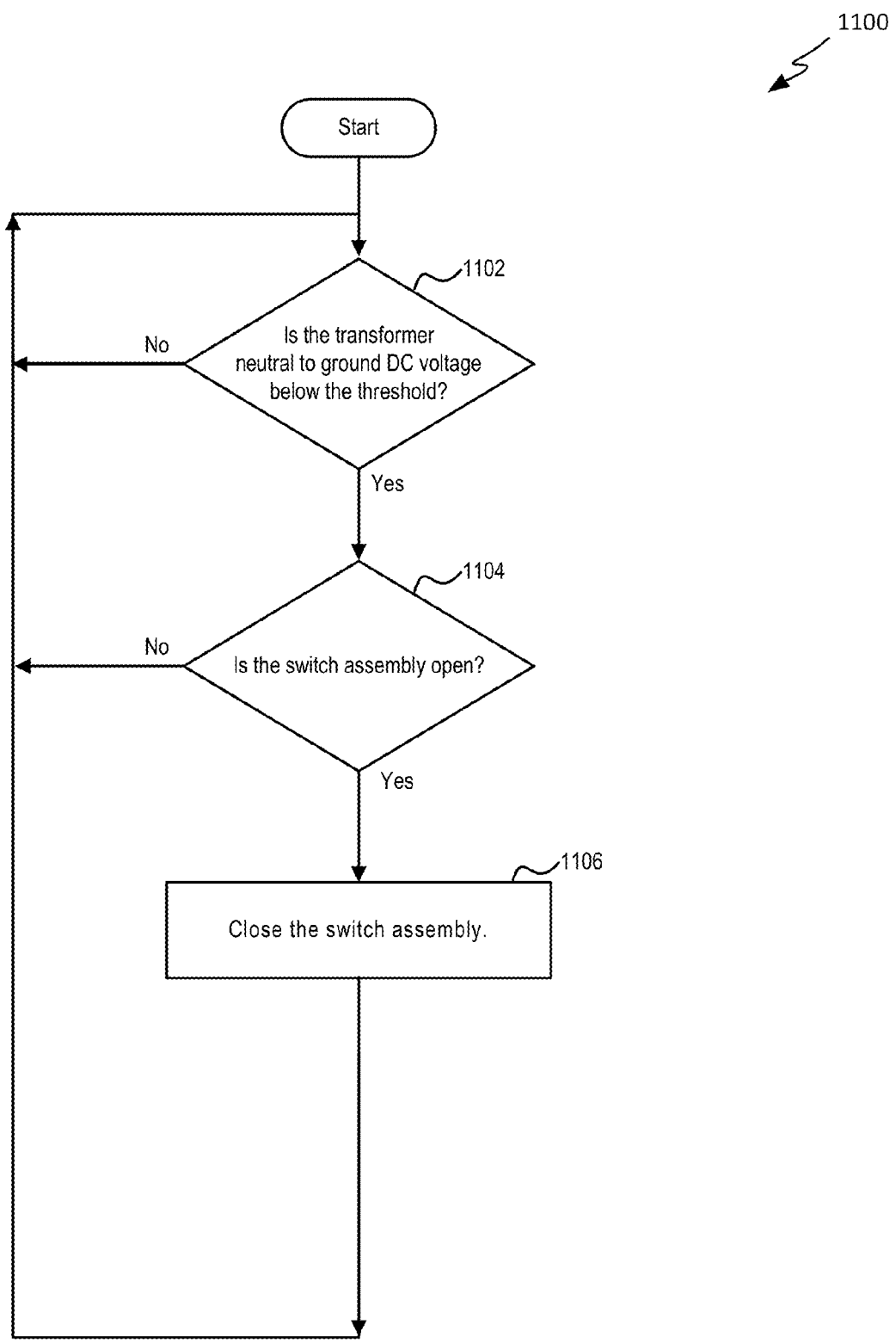
FIG. 11 illustrates an example process for determining whether a GIC event is over so that the control device of FIG. 3 can be returned to normal operation, according to a possible embodiment of the present disclosure.

Referring now to FIG. 11, an example test process 1100 performed by some embodiments of the control device 302 is illustrated. The test process 1100 operates to determine whether a GMID event is over so that the control device 302 can be returned to normal operation. At operation 1102, the transformer neutral to ground DC voltage as measured by voltage probe 316 is below a predetermined voltage threshold for at least a predetermined time period. In some embodiments, the predetermined voltage threshold is 8 volts and the predetermined time period is 3600 seconds.

If the threshold is satisfied, the process continues to operation 1104, where it is determined whether the switch assembly 202 is open (i.e., that the system 300 is operating in the GIC protective mode). If the switch assembly 202 is open, the process continues to operation 1106, where a signal is sent to cause the switch assembly 202 to close, thereby returning the system 300 to its normal mode.

Alternatively, if the transform neutral to ground DC voltage is not below the threshold at operation 1102 or the switch assembly 202 is determined to be closed at operation 1104, then the process returns to operation 1102 to continuously monitor the electrical protection circuit 200. Similarly, after completion of operation 1106, the process 1100 also returns to operation 1102 so as to perform continuous monitoring of the electrical protection circuit 200.

Figure 12:
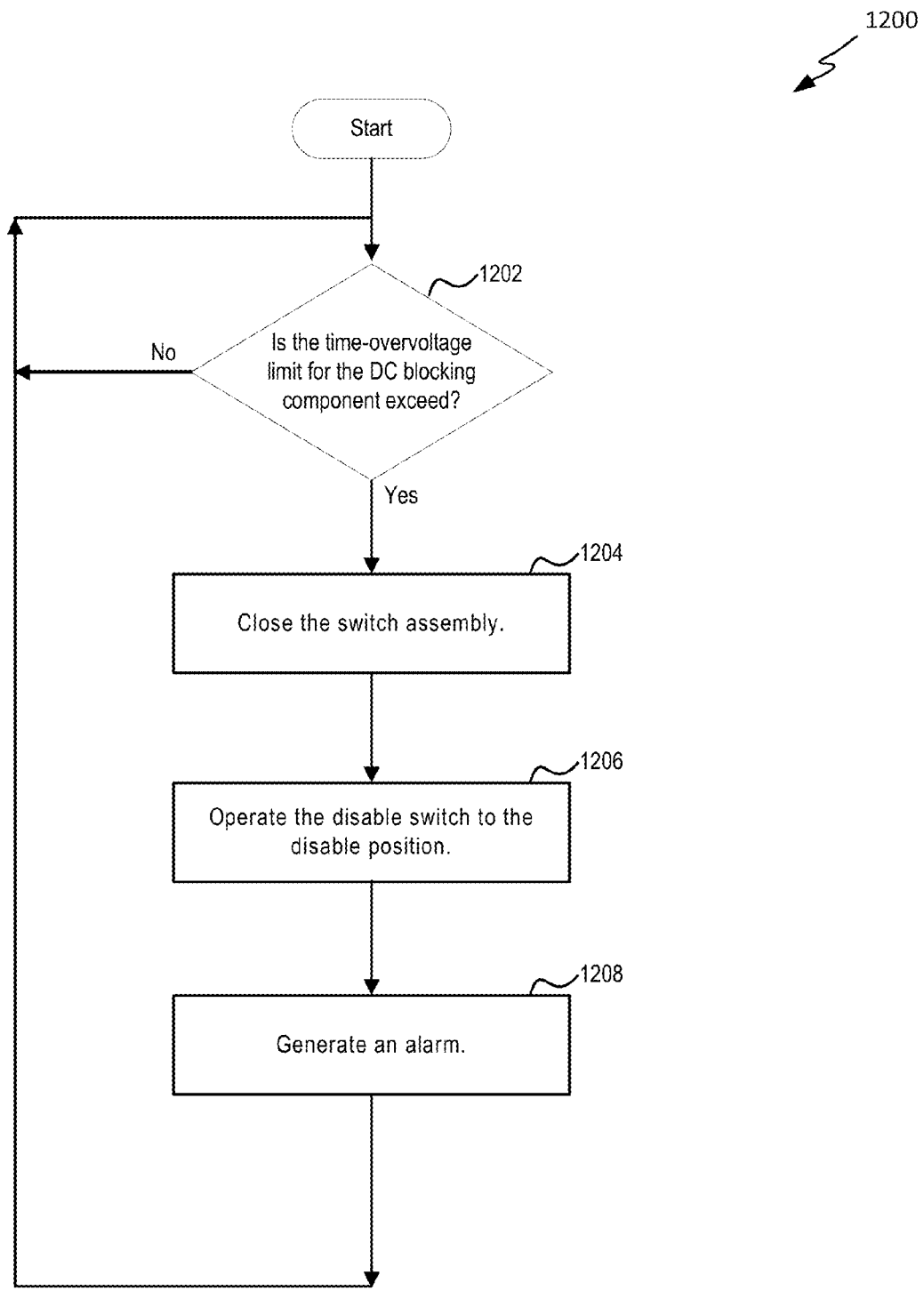
FIG. 12 illustrates an example process for protecting the DC current blocking component of FIG. 2 from overvoltages, according to a possible embodiment of the present disclosure.

Referring now to FIG. 12, an example test process 1200 performed by some embodiments of the control device 302 is illustrated. The test process 1200 operates to protect subcomponents (e.g., the capacitor bank 214 and the resistor 212) of the DC current blocking component 210 from over-voltages. At operation 1202, it is determined whether the time-overvoltage limits of the capacitor bank 214 or resistor 212 have been exceeded. The time-overvoltage (TOV) is determined based on how long a corresponding device is at or above a voltage, i.e., either a direct current (DC) or alternating current (AC) voltage. TOV is tracked by calculating a total time at which the predetermined voltage level is met or exceeded. In some embodiments, the time-overvoltage limits of one or both of the capacitor bank 214 or resistor 212 are stored in the memory device 320 of the control module 304. If so, the process continues to operation 1204, where a signal is sent to close the switch assembly 202. If not, the process repeats operation 1202 to continuously monitor the electrical protection circuit 200.

At operation 1206, the disable switch is operated to the disable position. In some embodiments, the system 300 will not enter the GIC protective mode when the disable switch is set to disable. Beneficially, the disable switch can be used to disable the protective mode when measurements indicate that the components used in the protective mode are not operational or require maintenance. At operation 1208, an alarm is generated. In some embodiments, a minor alarm is generated at operation 1208. Additionally, in some embodiments, the event is logged as well. After completion of operation 1208, the process 1200 returns to operation 1202 so as to perform continuous monitoring of the electrical protection circuit 200.

Figure 13:
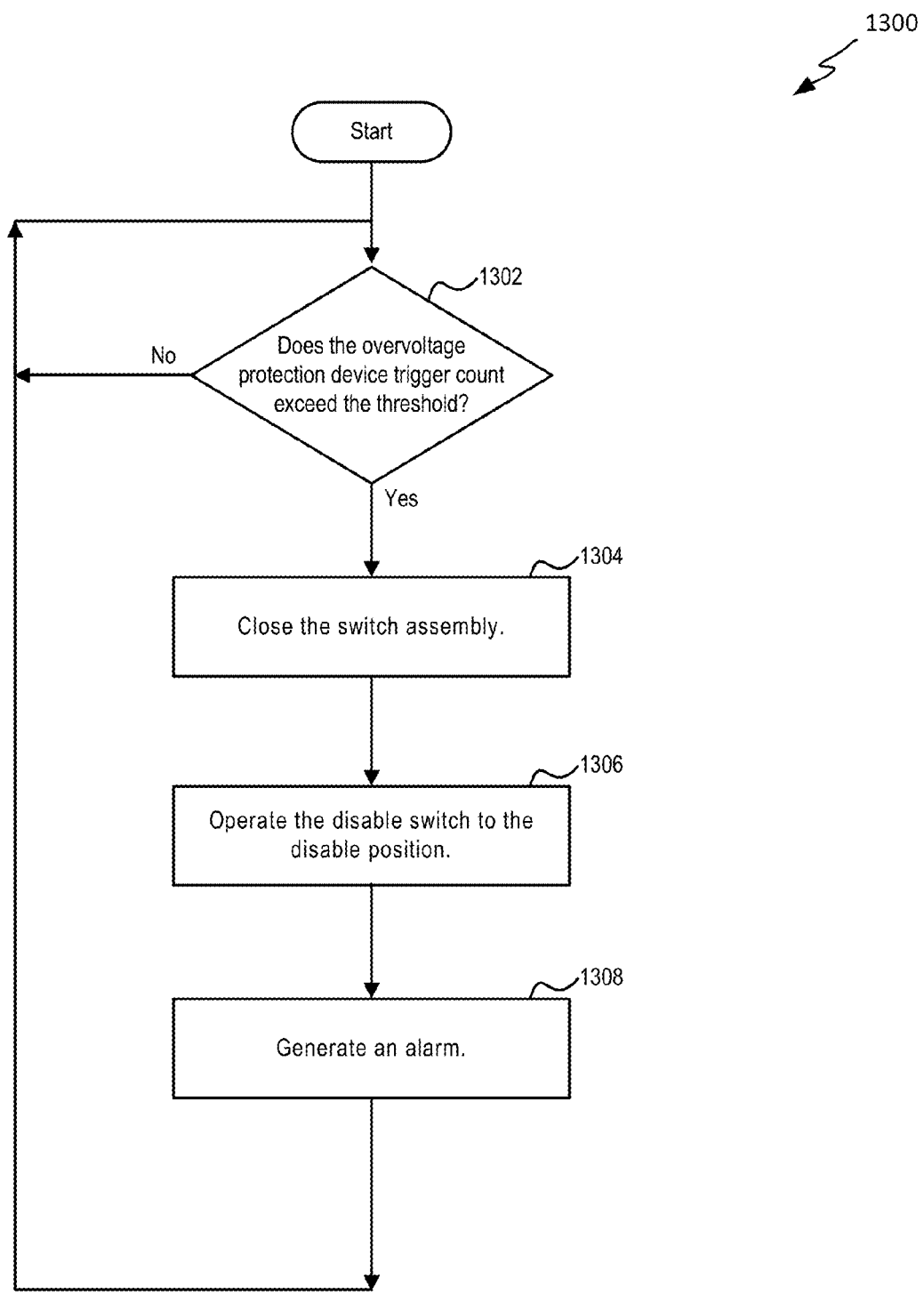
FIG. 13 illustrates an example process for determining whether the overvoltage protection device of FIG. 2 has exceeded a predetermined limit of trigger events, according to a possible embodiment of the present disclosure.

Referring now to FIG. 13, an example test process 1300 performed by some embodiments of the control device 302 is illustrated. The test process 1300 operates to determine whether the overvoltage protection device 216 may be in need of inspection or repair due to exceeding a predetermined limit of recorded events. At operation 1302, it is determined whether the value of the overvoltage protection device counter exceeds a predetermined threshold. In some embodiments, the predetermined threshold is 10 events. As illustrated and described with respect to FIG. 6, a counter is incremented each time it is detected that the overvoltage protection device 216 operated or fired. The value of the counter may be stored in the memory device 320 of the control module 304. In some embodiments, the counter is reset to zero after the overvoltage protection device 216 has been manually inspected or repaired. If the predetermined threshold has been exceeded (or in some embodiments met), the process continues to operation 1304, where a signal is sent to close the switch assembly 202. If not, the process repeats operation 1302 to continuously monitor the electrical protection circuit 200.

At operation 1306, a disable switch is operated to the disable position to prevent the system 300 from entering the GIC protective mode. At operation 1308, an alarm is generated. In some embodiments, a major alarm is generated at operation 1308. In some embodiments, the alarm transmits a message to dispatch maintenance personnel to the overvoltage protection device 216. The most likely action by maintenance personnel will be to inspect and replace or re-gap the spark gap electrodes in the overvoltage protection device 216 that appear to be excessively worn or ablated in the area of their gap spacing. Additionally, in some embodiments, the event is logged as well. After completion of operation 1308, the process 1300 returns to operation 1302 so as to perform continuous monitoring of the electrical protection circuit 200.

Figure 14:
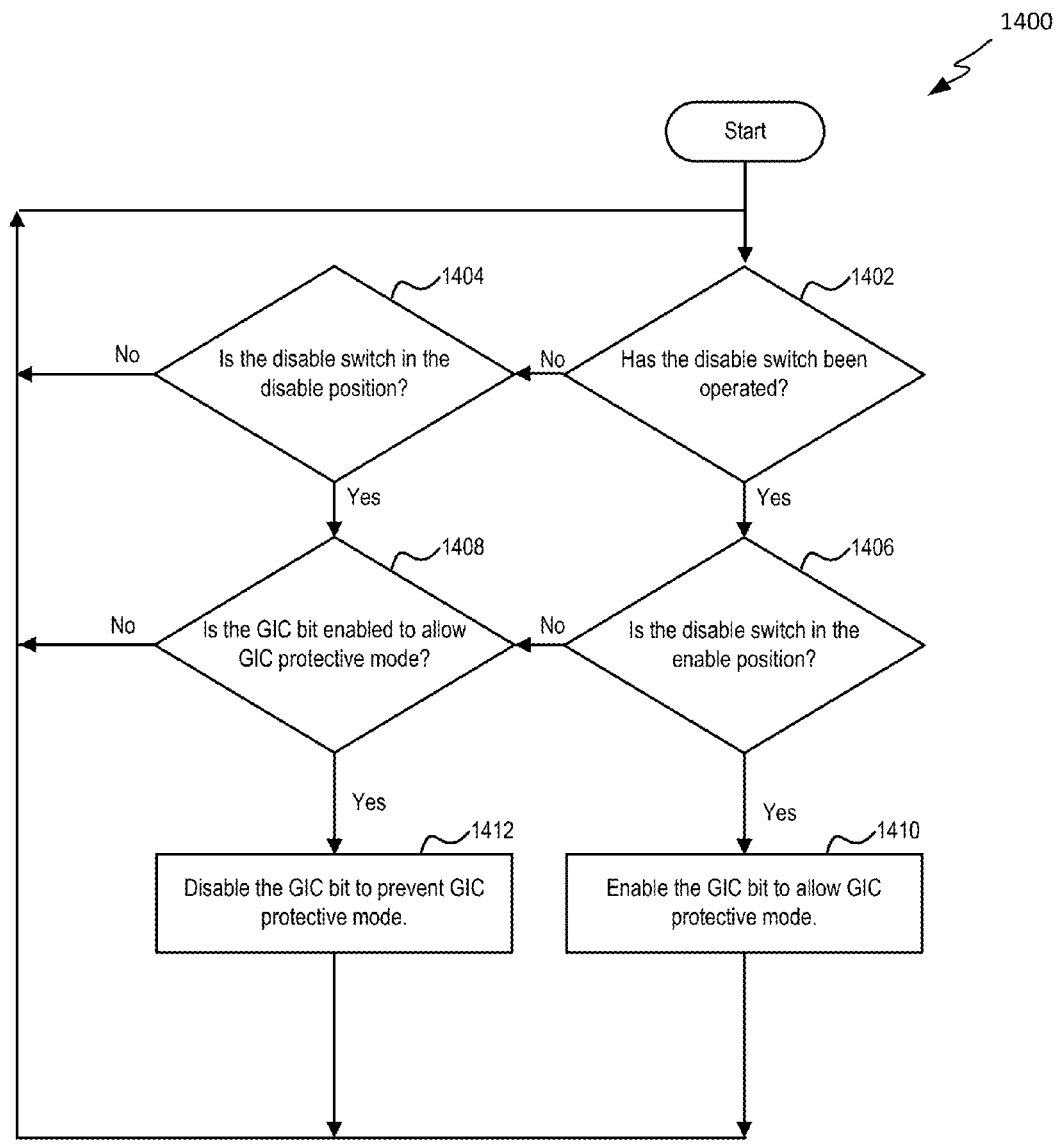
FIG. 14 illustrates an example process for determining whether the disable switch has been operated to allow or block the control device of FIG. 1 from entering the GIC protective mode, according to a possible embodiment of the present disclosure.

Referring now to FIG. 14, an example test process 1400 performed by some embodiments of the control device 302 is illustrated. The test process 1400 operates to determine whether the disable switch has been operated by the control device 302 or by a local or remote operator in order to enable or disable the GIC protective mode.

At operation 1402, it is determined whether the disable switch has been operated. For example, determining whether the disable switch has been operated may comprise comparing the current position of the disable switch to a previously determined position of the disable switch (which, for example, may be stored in a memory location). If so, the process continues to operation 1406, where it is determined whether the disable switch is in the enable position. If so, the process continues to operation 1410, where the GIC bit is enabled to allow the system to enter the GIC protective mode. If instead, it is determined at operation 1406 that the disable switch is not in the enable position, the process continues to operation 1408 to determine if the GIC bit is enabled. If so, the process continues to operation 1412 which disables the GIC bit to match the disable switch mode and prevent entering GIC protective mode.

If at operation 1402 it is determined that the disable switch has not been operated, the process continues to operation 1404 to determine if the disable switch is in the disable position. If so, then the process continues to operation 1408 to determine if the GIC bit is enabled. If so, the process continues to operation 1412, where the GIC bit is disabled to match the disable switch mode and prevent entering GIC protective mode.

After completion of operation 1410 or operation 1412, the process returns to operation 1402 so as to perform continuous monitoring of the electrical protection circuit 200. Additionally, if operation 1404 determines that the disable switch is not in the disable position or operation 1408 determines that the GIC bit is not enabled, the process returns to operation 1402 so as to perform continuous monitoring of the electrical protection circuit 200.

Although in the embodiments shown certain circuit components and example threshold values are provided, it is recognized that other circuit components or threshold values could be used as well consistent with the discussion in the present specification.

Overall, it is recognized that various embodiments of the present disclosure provide a number of advantages with respect to circuit protection, particularly with respect to either harmonic signals or DC or quasi-DC signals at a grounding connection of alternating current (AC) electrical equipment, such as a transformer used for power generation, transmission, or distribution. For example, blocking the DC or quasi-DC neutral current prevents half-cycle saturation in the transformer core which in turn prevents transformer over-heating, damage or failure. Additionally the DC current blocking also improves the power quality by reducing harmonics which can activate power system relays and cause major instabilities as well as power outages. This largely prevents the tripping of utility power system relays, the disconnection of power compensation and other critical components, and in turn avoids the partial or total collapse of a power grid in the event of GMD or HEMP-E3 events.

The above specification, examples, and data provide a complete description of the manufacture and use of the composition of the invention. Since many embodiments of the invention can be made without departing from the spirit and scope of the invention, the invention resides in the claims hereinafter appended.

The invention claimed is:

1. A control device for an electrical protection circuit useable in an alternating current system including a transformer, the electrical protection circuit including a switch assembly and being configured to operate in a first state and a second state based on the switch assembly, the control device comprising:
   (a) a first measurement probe configured to measure an electrical property;
   (b) a second measurement probe configured to measure an electrical property within the electrical protection circuit; and
   (c) a control module, including a processing device, the control module configured to execute instructions to:
      (i) monitor a measurement from the first measurement probe and transmit a protection activation control signal to the switch assembly based on the measurement from the first measurement probe exceeding a first predetermined threshold;
      (ii) monitor a measurement from the second measurement probe and transmit a protection deactivation control signal to the switch assembly based on the measurement from the second measurement probe satisfying a second predetermined threshold;
      (iii) calculate a time-overvoltage value based on an alternating current voltage and a direct current voltage between a transformer neutral of the transformer and a ground, as well as a time that the alternating current voltage or direct current voltage exceeds a preset limit; and
      (iv) disable transmitting the protection activation control signal based upon determining that the calculated time-overvoltage value exceeds a predetermined time-overvoltage threshold.

2. The control device of claim 1, wherein the first measurement probe is in series with the switch assembly.

3. The control device of claim 2, wherein the first measurement probe is configured to measure at least one of a direct current (DC) or a quasi-DC current, and the control module is further configured to execute instructions to detect a geomagnetic induced current based on the measurement from the first measurement probe.

4. The control device of claim 2, wherein the first measurement probe is configured to measure an alternating current (AC) and the control module is configured to generate an alarm based upon determining that the measurement from the first measurement probe exceeds the first threshold.

5. The control device of claim 1, wherein the second measurement probe comprises a current probe that is configured to measure an alternating current (AC) and the second predetermined threshold is satisfied when the measured alternating current (AC) exceeds 5,000 amps.

6. The control device of claim 5, wherein the current probe is electrically connected to a path that is parallel to the switch assembly.

7. A control device for an electrical protection circuit useable in an alternating current system including a transformer, the electrical protection circuit including a switch assembly and being configured to operate in a first state and a second state based on the switch assembly, the control device comprising:
   (a) a first measurement probe configured to measure an electrical property;

(b) a second measurement probe configured to measure an electrical property within the electrical protection circuit; and
(c) a control module, including a processing device, the control module configured to execute instructions to:
  (i) monitor a measurement from the first measurement probe and transmit a protection activation control signal to the switch assembly based on the measurement from the first measurement probe exceeding a first predetermined threshold; and
  (ii) monitor a measurement from the second measurement probe and transmit a protection deactivation control signal to the switch assembly based on the measurement from the second measurement probe satisfying a second predetermined threshold;
wherein the second measurement probe comprises a current probe that is configured to measure a neutral alternating current (AC) and the control module is further configured to execute instructions to:
disable transmitting the protection activation control signal based upon determining that the measurement from the second measurement probe satisfies the second predetermined threshold for at least a predetermined duration of time; and
enable transmitting the protection activation control signal based upon determining that the measurement from the second measurement probe fails to satisfy the second predetermined threshold for at least a second predetermined duration of time.

8. A control device for an electrical protection circuit useable in an alternating current system including a transformer, the electrical protection circuit including a switch assembly and being configured to operate in a first state and a second state based on the switch assembly, the control device comprising:
(a) a first measurement probe configured to measure an electrical property;
(b) a second measurement probe configured to measure an electrical property within the electrical protection circuit; and
(c) a control module, including a processing device, the control module configured to execute instructions to:
  (i) monitor a measurement from the first measurement probe and transmit a protection activation control signal to the switch assembly based on the measurement from the first measurement probe exceeding a first predetermined threshold; and
  (ii) monitor a measurement from the second measurement probe and transmit a protection deactivation control signal to the switch assembly based on the measurement from the second measurement probe satisfying a second predetermined threshold;
wherein the second measurement probe comprises a voltage probe that is configured to measure a DC voltage and the second predetermined threshold is satisfied when the measured DC voltage is below eight volts for at least 3,600 seconds.

9. The control device of claim 8, wherein the second measurement probe is electrically connected between a transformer neutral of the transformer and a ground.

10. The control device of claim 1, wherein the second measurement probe comprises a current probe configured to detect an open connection between the transformer neutral and the ground and the control module is configured to generate an alarm and disable transmitting the protection activation control signal based upon determining that measurement from the current probe satisfies the second predetermined threshold when the measurement from the current probe is below 0.5 amps for at least 60 seconds.

11. The control device of claim 1, further comprising a current probe configured to measure a current through an overvoltage protection device, and wherein the control module is further configured to monitor a measurement from the current probe and transmit the protection deactivation control signal to the switch assembly based upon the measurement from the current probe exceeding a predetermined current threshold.

12. The control device of claim 11, wherein the control module is further configured to increment an event counter based upon the measurement from the current probe exceeding the predetermined current threshold.

13. The control device of claim 12, wherein the control module is further configured to disable activation of the protection mode upon determining that the event counter exceeds a predetermined event count.

14. The control device of claim 12, wherein the control module is further configured to generate an alarm upon determining that the event counter exceeds a predetermined event count.

15. The control device of claim 1, wherein the protection activation control signal activates a protection mode of the electrical protection circuit by opening a switch to prevent current through the switch assembly and to provide alternating current (AC) grounding through a capacitor bank of the electrical protection circuit, and the protection deactivation control signal deactivates the protection mode of the electrical protection circuit by closing the switch to allow current through the switch assembly and to disable the alternating current (AC) grounding through the capacitor bank of the electrical protection circuit.

16. The control device of claim 1, wherein the first measurement probe is configured to measure a current through the switch assembly of the electrical protection circuit and the second measurement probe is configured to measure current through an overvoltage protection device, the control device further comprising:
  a current probe configured to measure a current in the electrical protection circuit through a path that is parallel to the switch assembly; and
  a voltage probe configured to measure a voltage between the transformer neutral of the transformer and a ground.

17. An electrical protection system useable in an alternating current system including a transformer, the system comprising:
  a control module, including a processing device, the control module configured to execute instructions to:
    (a) monitor a first received measurement corresponding to a first electrical property within an electrical protection circuit and transmit a protection activation control signal to a switch assembly of the electrical protection circuit based on the first received measurement satisfying a first predetermined threshold; and
    (b) monitor a second received measurement corresponding to a second electrical property within the electrical protection circuit different from the first electrical property and transmit a protection deactivation control signal to the switch assembly based on the second received measurement satisfying a second predetermined threshold; and
  a first measurement probe configured to measure the first electrical property of the electrical protection circuit and a second measurement probe configured to measure the second electrical property of the electrical protection circuit;

wherein the first received measurement is received from the first measurement probe, and wherein the first measurement probe comprises a current probe configured to measure a current through the switch assembly.

18. The electrical protection system of claim 17, further comprising the electrical protection circuit including the switch assembly.

19. An electrical protection system useable in an alternating current system including a transformer, the system comprising:

a control module, including a processing device, the control module configured to execute instructions to:

(a) monitor a first received measurement corresponding to a first electrical property within an electrical protection circuit and transmit a protection activation control signal to a switch assembly of the electrical protection circuit based on the first received measurement satisfying a first predetermined threshold; and (b) monitor a second received measurement corresponding to a second electrical property within the electrical protection circuit different from the first electrical property and transmit a protection deactivation control signal to the switch assembly based on the second received measurement satisfying a second predetermined threshold;

(c) monitor a third received measurement corresponding to a current through an overvoltage protection device of the electrical protection circuit;

(d) increment an event counter upon the third received measurement exceeding a predetermined current threshold;

(e) disable transmission of the protection activation control signal upon determining that the event counter exceeds a predetermined event count; and (f) generate an alarm upon determining that the event counter exceeds the predetermined event count.

* * * * *

UNITED STATES PATENT AND TRADEMARK OFFICE
CERTIFICATE OF CORRECTION

PATENT NO. : 10,199,821 B2
APPLICATION NO. : 14/989631
DATED : February 5, 2019
INVENTOR(S) : Fuchs et al.

Page 1 of 1

It is certified that error appears in the above-identified patent and that said Letters Patent is hereby corrected as shown below:

On the Title Page

Item (54) and in the Specification, Column 1 Line 1, "SYSTEMS AND METHODS FOR ACTUATING A TRANSFORMER NEUTRAL BLOCKING SYSTEM" should read --CONTROL SOFTWARE FOR ACTUATING A TRANSFORMER NEUTRAL BLOCKING SYSTEM--

Signed and Sealed this
Eighteenth Day of June, 2019

Andrei Iancu
*Director of the United States Patent and Trademark Office*